(12) United States Patent
McKeough

(10) Patent No.: US 9,719,209 B2
(45) Date of Patent: Aug. 1, 2017

(54) METHOD FOR LEACHING RECOVERY-BOILER ASH

(71) Applicant: ANDRITZ OY, Helsinki (FI)

(72) Inventor: Paterson McKeough, Tähtelä (FI)

(73) Assignee: Andritz Oy, Helsinki (FI)

( * ) Notice: Subject to any disclaimer, the term of this patent is extended or adjusted under 35 U.S.C. 154(b) by 143 days.

(21) Appl. No.: 14/442,165

(22) PCT Filed: Nov. 15, 2013

(86) PCT No.: PCT/FI2013/000043
§ 371 (c)(1),
(2) Date: May 12, 2015

(87) PCT Pub. No.: WO2014/076361
PCT Pub. Date: May 22, 2014

(65) Prior Publication Data
US 2016/0289793 A1   Oct. 6, 2016

(30) Foreign Application Priority Data

Nov. 16, 2012   (FI) ..................... 20126204

(51) Int. Cl.
*D21C 11/06* (2006.01)
*D21C 11/00* (2006.01)
(Continued)

(52) U.S. Cl.
CPC ............ *D21C 11/066* (2013.01); *C22B 7/007* (2013.01); *C22B 26/10* (2013.01);
(Continued)

(58) Field of Classification Search
CPC .................................................. D21C 11/066
See application file for complete search history.

(56) References Cited

U.S. PATENT DOCUMENTS

| 3,746,612 A | 7/1973 | Rapson et al. |
| 2011/0067829 A1 | 3/2011 | Foan et al. |

FOREIGN PATENT DOCUMENTS

| EP | 2 025 807 | 2/2009 |
| WO | WO 95/06775 | 3/1995 |

(Continued)

OTHER PUBLICATIONS

Goncalves et al., Effect of Neutralization of Recovery Boiler Ash in Ash Leaching, 2008, TAPPI Engineering, Pulping and Environmental Conference.*
Lindtrom et al., Non Process Element Control in the Liquor Cycle Through Use of an Ash Leaching System, Mar. 2010, International Chemical Recovery Conference.*

(Continued)

*Primary Examiner* — Anthony Calandra
(74) *Attorney, Agent, or Firm* — Nixon & Vanderhye P.C.

(57) ABSTRACT

A method to be used in conjunction with a single-stage or multi-stage process for leaching ash originating from the recovery boiler of a pulp mill, particularly when the ash contains a significant amount of carbonate, wherein calcium compounds, such as calcium oxide (CaO) or calcium hydroxide ($Ca(OH)_2$), are employed as additives in one or more leaching stages, a liquid fraction formed in the leaching process is utilized outside the main chemical recovery cycle, such as a substitute for purchased sodium hydroxide in the bleaching line of the pulp mill, and a solids fraction may be mixed with a black-liquor stream of the mill or subjected to further processing to separate calcium compounds for recycle.

17 Claims, 1 Drawing Sheet

(51) Int. Cl.
    *D21C 11/12*         (2006.01)
    *C22B 7/00*          (2006.01)
    *C22B 26/10*        (2006.01)

(52) U.S. Cl.
    CPC .......... *D21C 11/0007* (2013.01); *D21C 11/12* (2013.01); *D21C 11/0064* (2013.01); *Y02P 40/44* (2015.11)

(56) References Cited

FOREIGN PATENT DOCUMENTS

WO    WO 2011/002354    1/2011
WO    WO 2011/020949    2/2011

OTHER PUBLICATIONS

Valmet, AshLeach Increased recovery boiler availability, Feb. 2014.*
Goncalves et al.,Chloride and potassium removal efficiency of an ash leaching system, Pulp and Paper Canad, 2008, 109:3 , p. 33-38.*
Antti Frigard, Reactive leaching of recoery boiler fly ash (abstract only) , May 17, 2016, Thesis Aalto University.*
Saturnino et al., Prediction of the solubility of recovery boiler precipitator ash, May 2009, TAPPI Journal, p. 26-31.*
International Search Report for PCT/FI2013/000043 mailed Apr. 23, 2014, three pages.
Written Opinion of the ISA for PCT/FI2013/000043 mailed Apr. 23, 2014, six pages.

* cited by examiner

METHOD FOR LEACHING RECOVERY-BOILER ASH

RELATED APPLICATION

This application is the U.S. national phase of International Application No. PCT/FI2013/000043 filed Nov. 15, 2013 which designated the U.S. and claims priority to FI 20126204 filed Nov. 16, 2012, the entire contents of each of which are hereby incorporated by reference.

TECHNICAL FIELD

The present method deals with the leaching of ash originating from the recovery boiler of a pulp mill, particularly when the ash contains a significant amount of carbonate. The objective of the ash-leaching process is to purge chlorine and potassium, two of the so-called non-process elements, from the chemical recovery cycle of the pulp mill.

PRIOR ART

The fly-ash mainly contains sodium sulphate, but it also contains carbonate, potassium and chlorides. Leaching of recovery-boiler fly-ash (e.g. ash separated by an electrostatic precipitator) is a known method of purging chlorine and potassium from the chemical recovery process of pulp mills employing alkaline pulping processes. Without purging, these elements would, in general, accumulate to levels which would lead to unacceptable extents of fouling and corrosion in the recovery boiler of the pulp mill. In the conventional ash-leaching process, a limited amount of water is added to the ash so that the ash is only partially dissolved. Chlorine (Cl) and potassium (K) are enriched in the solution; i.e., compared to the other elements, their contents are higher in the solution than they are in the ash. A major part of the sodium salts in the original ash material remains as solids in the slurry. The solids are separated from the solution using, for example, a decanter centrifuge and the solids are returned to the recovery cycle by adding them to the spent pulping liquor (black liquor). Part of the solution is usually recycled to the leaching tank and part is purged to the sewer.

Carbonate ($CO_3$) in the ash has a detrimental effect on the performance of the separation step when its content in the ash exceeds about 5%. In this case, to ensure a satisfactory separation of solids from the solution, sulphuric acid ($H_2SO_4$) is usually added in the leaching stage to convert part of the carbonate to sulphate ($SO_4$). For example, if the carbonate content in the ash is 10%, about 80 kg of $H_2SO_4$ per ton of ash is typically added into the leaching tank.

The conventional ash-leaching process is described in more detail in, for example, the article: Honkanen, R. & Kaila, J., Experiences in Various Chloride Removal Technologies, Proc. 2010 International Chemical Recovery Conference, Williamsburg, USA, Tappi Press, Vol 2, pp. 259-267. An example of a variation on this process is a two-stage process disclosed in the patent application document WO2011/002354A1. It should be noted that the separation step does not, in general, lead to a perfect separation of solids from a solution. The stream comprised primarily of solid material contains entrained solution, while the other stream, comprised primarily of solution, may contain some residual solids. For the purposes of the present document, the former stream is herein defined as the solids fraction and the latter stream is herein defined as the liquid fraction. Note that a multistage leaching process will include more than one solids-fraction stream and more than one liquid-fraction stream.

The use of $H_2SO_4$ as an additive in the leaching process is becoming more and more problematic. The "natural" purging of sulphur from the chemical recovery cycle is nowadays at a much lower level than it was earlier. This means that even a relatively small extra addition of sulphur to the cycle has a measurable impact on the sodium-sulphur balance of the mill. When sulphur is added in the form of $H_2SO_4$, the end result is an increase in the requirement for sodium make-up in the form of sodium hydroxide (NaOH) or sodium carbonate ($Na_2CO_3$). In this way, the effective price of the $H_2SO_4$ becomes much higher than its purchase price.

The patent application WO00/61859 discloses a process, in which carbonate of the fly ash is broken down with hydrochloric acid, and sulphate is precipitated with calcium chloride. However, the addition of chlorine compounds to the process is not desirable.

Combustion temperatures in modern recovery boilers are higher than in the older boilers. Higher combustion temperature often means higher carbonate content in the ash, further emphasizing the need to find an alternate way of handling high-carbonate ash in the ash-leaching process.

In summary, there is a great need for a leaching method which would perform well with recovery-boiler ash containing a significant amount of carbonate but which would not require significant addition of $H_2SO_4$.

SUMMARY OF INVENTION

The present invention is a new method to be used in conjunction with a single-stage or multi-stage process for leaching ash of the recovery boiler of a pulp mill utilizing an alkaline cooking process. According to the method at least one calcium compound, at least calcium oxide (CaO) and/or calcium hydroxide ($Ca(OH)_2$), is employed as an additive in one or more leaching stages.

In the new method, at least CaO and/or $Ca(OH)_2$ is/are added and the added CaO and/or $Ca(OH)_2$ then reacts/react with carbonate in the ash via well-known reactions:

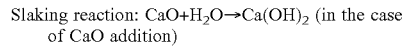
Slaking reaction: $CaO+H_2O \rightarrow Ca(OH)_2$ (in the case of CaO addition)

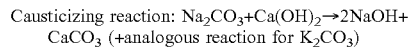
Causticizing reaction: $Na_2CO_3+Ca(OH)_2 \rightarrow 2NaOH+CaCO_3$ (+analogous reaction for $K_2CO_3$)

Note that, in certain preferred embodiments, the additive may contain other calcium compounds, such as calcium carbonate ($CaCO_3$), in addition to CaO and $Ca(OH)_2$, and/or compounds of other alkaline earth metals, such as magnesium (Mg), and/or impurities. Furthermore, the additive may be introduced in the form of water-based slurry. Furthermore, the new type of additive disclosed herein may be used together with other types of additive, such as $H_2SO_4$.

Because sodium hydroxide (NaOH) and potassium hydroxide (KOH) have higher solubility in water than any of the compounds present in the ash itself, the liquid fraction or fractions produced in the new process contain most of the hydroxide ion formed in the above causticizing reaction. The leaching conditions applied in conjunction with the new method (e.g. ash-water ratio, $CO_3$—CaO ratio, temperature, residence time) are such that (1) significant amounts of compounds in addition to hydroxides are dissolved in the liquid fraction(s) and (2), as in the conventional process, chlorine, and usually also potassium, are enriched in the liquid fraction(s). In the case of a single-stage leaching process, the mass ratio of ash to added water is preferably in the range 0.5-2. In the case of addition of CaO and/or Ca(OH)$_2$, the ratio of the moles of Ca added to the moles of CO$_3$ in the ash to be treated is preferably in the range of 0.5-3, more preferably in the range of 0.5-1.5. The temperature may typically be in the range of 50-100° C.

The hydroxide ion contained in the liquid fraction(s) formed in the new method may be exploited outside the main chemical recovery cycle of the pulp mill. In pulp mills that incorporate a bleaching line, utilization of the liquid fraction(s) to substitute purchased NaOH in the bleaching line is a preferred option. When the liquid fraction(s) is/are utilized outside the main chemical recovery cycle, the main function of the ash-leaching process—the purging of chlorine from the main cycle, usually together with the purging of potassium—is accomplished.

Thus, the new method offers a novel and elegant solution for reducing or eliminating addition of H$_2$SO$_4$ during leaching of recovery-boiler ash. When substitution of hydroxide—on site but outside the main chemical recovery cycle—is possible and is taken into account, the net sodium loss at a given extent of chlorine removal may even be lower than that of the corresponding conventional ash-leaching process.

The main—and very significant—advantage of the new method is the substitution of relatively expensive H$_2$SO$_4$ (having a high effective price because of its impact on the sodium-sulphur balance of the mill as described above) by relatively cheap calcium compounds. Another potential advantage is a lower level of net sodium loss compared to that typically encountered in the corresponding conventional ash-leaching process at the same extent of chlorine purging.

According to one embodiment employing calcium compound(s) as additive(s), one or more solids-fraction streams exiting the leaching process is/are led to a dissolving stage, in which the main part of those compounds that are readily dissolvable in water, such as sodium and potassium compounds, are dissolved in water or an aqueous solution. Thereafter solid material, comprised mainly of calcium compounds, such as CaCO$_3$ and Ca(OH)$_2$, is separated and led to the calcium cycle of the pulp mill, and the liquid fraction remaining is added to a black-liquor stream of the pulp mill.

SUMMARY OF DRAWINGS

The present new method is described in more detail with reference to the drawings, FIG. 1 and FIG. 2, each depicting one embodiment of the invention. The numbers and letters in FIG. 1 and FIG. 2 refer to the following streams and processing stages:
 1. Recovery-boiler ash
 2. Water or aqueous solution
 3. CaO and/or Ca(OH)$_2$
 4. Recycled liquid fraction
 5. Slurry
 6. Liquid fraction
 7. Purged liquid fraction
 8. Solids fraction
 9. Water or aqueous solution
 10. Slurry
 11. Liquid fraction
 12. Solids fraction
 A. Leaching stage
 B. Separation stage
 C. Dissolving stage
 D. Separation stage

DETAILED DESCRIPTION OF INVENTION

Figure 1:
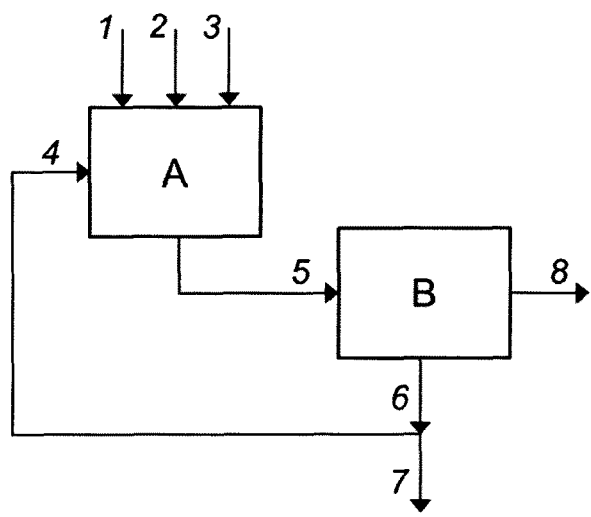

In the embodiment depicted in FIG. 1, ash (1) from the recovery boiler of the pulp mill, water or aqueous solution (2) and at least CaO and/or Ca(OH)$_2$ (3), together with recycled liquid fraction (4) are introduced into the leaching stage (A), which is typically carried out in a mixing tank. The slurry (5) exiting the leaching stage is led to the separation stage (B), which can be carried out using an applicable separation device, such as a decanter centrifuge or a filter. Part (4) of the liquid fraction (6) exiting the separation stage is recycled to the leaching stage (A). The remaining liquid fraction (7) is preferably utilized in the bleaching line of the pulp mill. The liquid fraction contains hydroxide ions and can be used to substitute NaOH.

The solids-fraction stream (8) which includes calcium compounds in addition to the undissolved ash compounds and which exits the separation stage (B) is preferably mixed with a black-liquor stream of the pulp mill and is thereby eventually led to the recovery boiler of the pulp mill.

Figure 2:
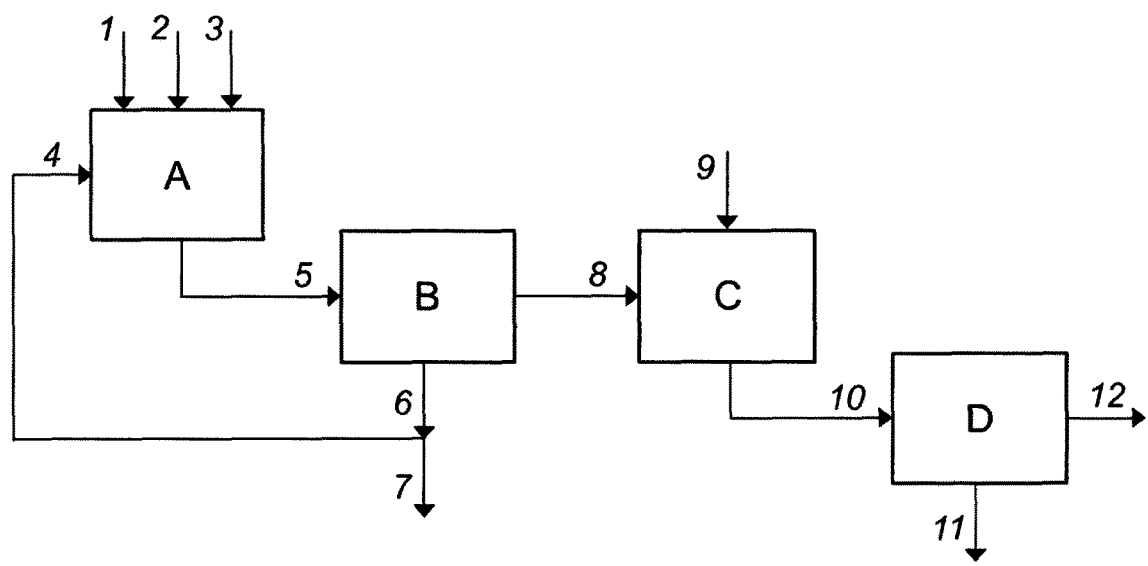

The embodiment depicted in FIG. 2 differs from that of FIG. 1 only in the further processing of the solids-fraction stream (8) exiting the separation stage (B). In the embodiment of FIG. 2, this stream (8) is led to a dissolving stage (C), in which the compounds readily dissolvable in water, such as sodium and potassium compounds, are dissolved in water or aqueous solution (9). The slurry (10) exiting the dissolving stage (C) is led to a separation stage (D). The liquid fraction (11) exiting the separation stage (D) is added to a black-liquor stream of the pulp mill and is thereby eventually led to the recovery boiler of the pulp mill. The solids-fraction stream (12) exiting the separation stage (D) is comprised mainly of calcium compounds and is led to the calcium cycle of the pulp mill.

EXAMPLE

About 40% of the ash from the recovery boiler of a certain pulp mill, corresponding to about 55 kg of ash per air-dried ton (ADt) of pulp, is subjected to a single-stage leaching process. The carbonate content of the ash is around 10%. About 5 kg of burnt lime (CaO) per ADt of pulp, taken from the calcium cycle of the mill, is added to the leaching vessel before or during the leaching treatment. In the case of the corresponding conventional ash-leaching process, about 4.4 kg of H$_2$SO$_4$ per ADt would have been added to the leaching vessel.

After the leaching treatment, solids are separated from the slurry in a straightforward manner. The liquid fraction remaining is utilized in the bleaching line of the mill. The solids fraction is led to a dissolving vessel where sodium and potassium compounds are dissolved in water. Calcium compounds remain, to a large extent, un-dissolved. Calcium compounds are separated out and returned to the calcium cycle of the mill, while the aqueous solution is added to a black-liquor stream of the mill.

At this pulp mill, the effective price of added H$_2$SO$_4$ (allowing for impact on the sodium-sulphur balance of the mill) is about 300 €/t. It of H$_2$SO$_4$, while the effective marginal price of CaO (mainly due to the cost of lime-kiln fuel and allowing for an increased evaporation duty) is about 100 €/t of CaO. Thus, in the new process, the effective cost of the additive (CaO) amounts to about 0.5 €/ADt, which is significantly lower than the effective cost of the additive ($H_2SO_4$) in the corresponding conventional ash-leaching process: about 1.3 €/ADt.

The embodiments of the present invention are not limited to those mentioned or described herein; instead they may vary within the scope of the claims.

The invention claimed is:

1. A method for treating ash of a recovery boiler of a pulp mill comprising:
   performing a single-stage or multi-stage leaching process in which at least one calcium compound is added as an additive to the ash from the recovery boiler in one or more leaching stages, and wherein the at least one calcium compound added is calcium oxide or calcium hydroxide.

2. The method as in claim 1, wherein both the calcium oxide and the calcium hydroxide are added as the additive to the ash.

3. The method as in claim 1, further comprising utilizing one or more liquid-fraction streams exiting the single-stage or the multi-stage leaching process outside of a main chemical recovery cycle of the pulp mill.

4. The method as in claim 3, further comprising utilizing hydroxide ion contained in the one or more liquid-fraction streams.

5. The method as in claim 4, further comprising utilizing the hydroxide ion in a bleaching line of the pulp mill.

6. The method as in claim 1, further comprising mixing one or more solids-fraction streams exiting the single-stage or the multi-stage leaching process with black liquor in the pulp mill.

7. The method as in claim 1, further comprising:
   feeding one or more solids-fraction streams exiting the single-stage or the multi-stage leaching process to a dissolving stage,
   dissolving in the dissolving stage compounds of the one or more solids-fraction streams in water or an aqueous solution,
   after the one or more solids-fraction streams flow through the dissolving stage, separating the streams into solids and a liquid fraction, wherein the separated solids include at least one of calcium carbonate and calcium hydroxide,
   feeding the separated solids to a calcium cycle of the pulp mill, and
   adding the liquid fraction to black liquor in the pulp mill.

8. A method to treating ash from a recovery boiler comprising:
   adding at least one of calcium oxide and calcium hydroxide to the ash;
   leaching the ash after or during the addition of the at least one of calcium oxide and calcium hydroxide, and
   separating a solid fraction from the leached ash.

9. The method of claim 8 wherein an amount of the at least one calcium oxide and calcium hydroxide added to the ash is greater than an amount of $H_2SO_4$ added to the ash.

10. The method of claim 8 further comprising separating a liquid from the leaching of the ash and utilizing the separated liquid outside of a chemical recovery cycle in a pulp mill.

11. The method of claim 10 further comprising utilizing a hydroxide ion contained in the separated liquid.

12. The method of claim 11 further comprising adding the hydroxide ion to a bleaching line in the pulp mill.

13. The method of claim 8 further comprising separating solids from the leached ash and mixing the solids with black liquor in a pulp mill.

14. The method of claim 8 wherein the leaching of the ash is performed in a multi-stage leaching process.

15. The method of claim 8 further comprising:
   forming a solids-fraction stream from the leached ash;
   dissolving compounds of sodium or potassium from the solids-fraction stream in a water or an aqueous solution;
   separating solids and liquids from the solids-fraction stream after the dissolving step;
   feeding the separated solids to a calcium cycle of a pulp mill, and
   adding the separated liquids to black liquor in the pulp mill.

16. The method of claim 8 further comprising separating a liquid fraction from the leached ash and feeding at least a portion of the liquid fraction to the leaching step.

17. The method of claim 16 further comprising feeding another portion of the liquid fraction to a bleaching process in a pulp mill.

* * * * *